Patented June 6, 1944

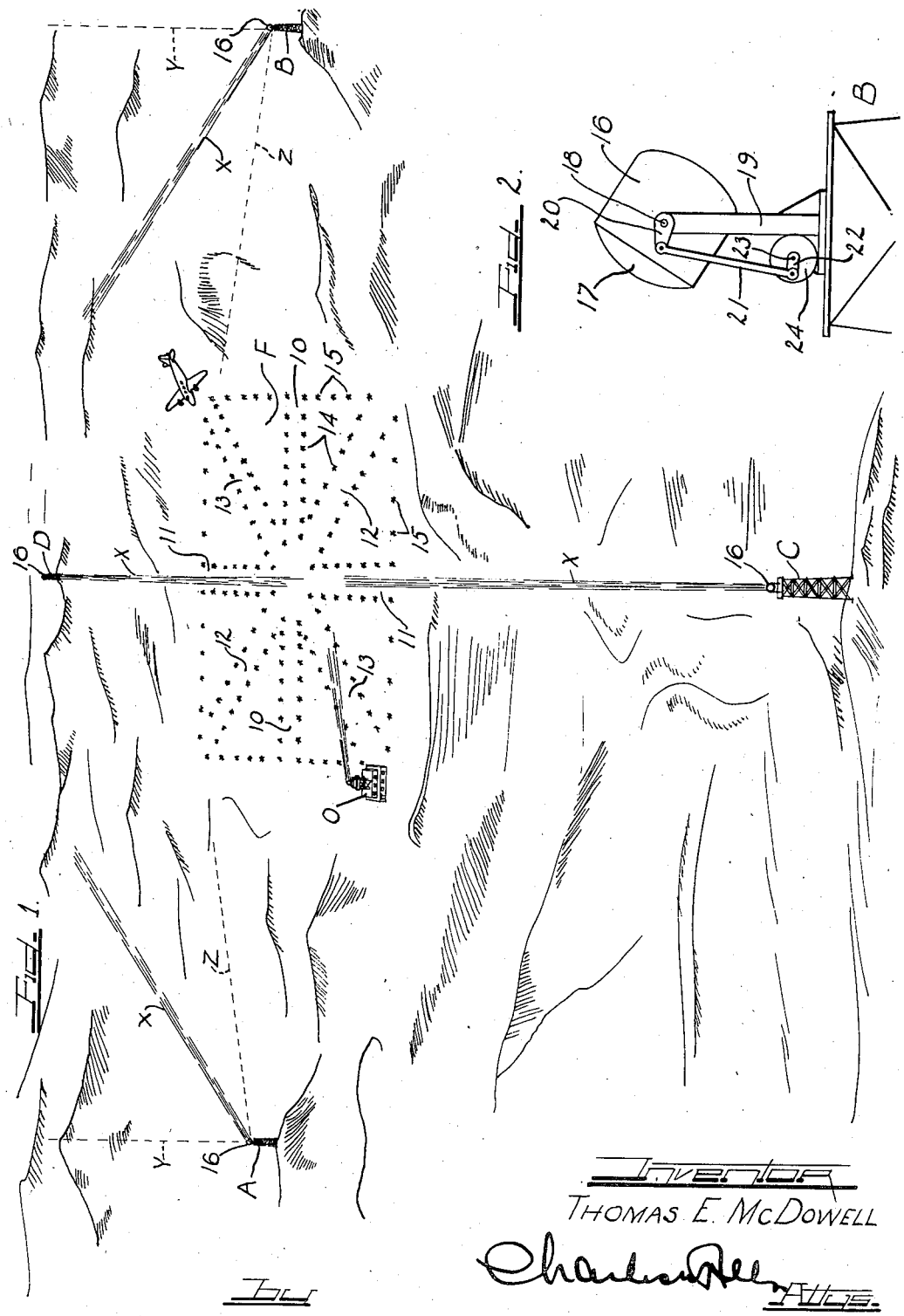

2,350,407

UNITED STATES PATENT OFFICE 2,350,407

AIRPLANE LANDING FIELD LOCATIONING SYSTEM AND MEANS

Thomas E. McDowell, Chicago, Ill., assignor to The Pyle-National Company, Chicago, Ill., a corporation of New Jersey Application September 5, 1941, Serial No. 409,705

2 Claims. (Cl. 177—352)

My invention relates to an airplane landing field locationing system and means for enabling incoming pilots to accurately determine the exact location of the field in case the field is obscured by weather or atmospheric conditions, such as low clouds, haze, smoke, dust, or other disturbance above but comparatively close to the field.

Landing fields are illuminated by runway lights and border lights which, under ordinary weather conditions, will enable an incoming pilot to accurately approach the field for proper and safe landing. However, at times the field may be obscured by abnormal atmosphere or weather conditions, such as smoke, haze, low clouds, or other obscuring conditions so that the pilot approaching the field from a distance will be more or less uncertain and bewildered as to the exact location and outline of the field, requiring considerable guesswork and the taking of chances to get down to the field below the disturbing conditions for guidance by the runway and border lights for safe landing.

In accordance with my invention I provide one or more beam projecting beacons, preferably on towers, at a sufficient distance away from the outskirts of the field and operated to oscillate the beams preferably in vertical planes passing through the air field center so that, from the operation and directioning of these beams an incoming pilot may determine from a considerable distance above the field the exact location thereof so that he can get down below the obscuring medium above the field for accurate approach under guidance of the field lights and safe landing. The beacons will operate rhythmically and at a predetermined rate so that their directioning beams will not be confused with other beacons in the neighborhood of the field, and with the operation of these high candle power beams such that other incoming pilots will not be blinded or their safe landing on the field interfered with in any way.

On the drawing:

Figure 1 is a perspective view of a landing field and surrounding terrain and showing a number of directioning and locationing beacons; and Figure 2 is an enlarged view of one of the beam projecting beacons mounted on top of a tower with means for effecting vertical oscillation of the projector and beam.

Figure 1 shows a rectangular landing field F having the longitudinally extending runways 10, the transversely extending runways 11 and diagonal runways 12 and 13, the runways intersecting at the center of the field. Runway lights 14 and border lights 15 are usually provided and at one corner of the field is a control building O from which pilots are communicated with. I have shown four beacon and directioning towers A, B, C, and D located at some distance from the edge of the field, probably a mile or two depending upon the conditions and terrain around the field. On each tower is mounted a beam projector comprising an illuminant supporting body and reflector 16 and a suitable lens 17. The body is supported by trunnions 18 on a pedestal 19, one of the trunnions having a lever arm 20 extending therefrom connected by a link 21 with a crank arm 22 on the shaft 23 of a driving source such as an electric motor 24, the length of the crank arm relative to the lever arm being such that upon rotation of the motor, the lever arm 20 will be oscillated by the link 21 for vertical oscillation of the projector frame 16 and the beam X projected therefrom. As shown on Figure 1, the driving connection between the motor and the projectors may be such that the projected beam will oscillate through an arc between a vertical line Y and a laterally extending line Z, the oscillation of the beam being from the vertical line downwardly toward the field to the line Z and then back to the vertical, at regular intervals. With the arrangement shown the beams from the towers A and B will oscillate in vertical planes extending through the longitudinal runways 10, while the beams from the towers C and D will oscillate in planes extending through the transverse runways 11. The motors 24 may be of the synchronous type fed from an alternating current circuit so that all the beams will oscillate rhythmically from the vertical toward horizontal and back to vertical, at certain predetermined intervals, for example twenty oscillations per minute. Any convenient means may be employed for insuring synchronous operation of the motors and lamps, such for instance as is shown in the patent to O. L. Dupy, 1,579,286 of April 6, 1926, or H. M. Stoller, 1,573,333 of February 16, 1926. As the beams swing downwardly they will point toward the vertical axis of the field, and a pilot in an airplane approaching the field from a distance will observe the operation of the beams and from such operation can accurately determine the exact location of the field even though the field and the field lights are partially or totally obscured by atmospheric or weather conditions such as haze, smoke, dust, or other abnormal disturbances. By circling around the field under guidance of these beams and thereby exact locationing of the field he can fly down to the field below the obscuring medium and then be guided by the field lights for approaching the selected runway and safe landing. Preferably the lateral beam lines Z do not reach horizontal but approach the horizontal at an angle of say twenty degrees from the horizontal so that the beams will not blind aviators or interfere with their approaching and landing on the field.

Under some conditions one oscillating beacon on the outskirts of a field would be sufficient for guiding aviators to the field, and under other conditions more oscillating beacons would be desirable. Instead of oscillation of the beam in a vertical plane, the oscillation could be in other planes, or the beams could be given a composite oscillation. However whatever the oscillation is it should be regular, and where a number of beams are provided, their oscillation should be regular and cooperative so that the directioning by the beams will be outstanding and not interfered with by other beams or illuminating means which might be in the vicinity of the airport.

I have thus produced a very efficient system and means for making the operation of airports safer by enabling pilots to accurately locate the field for landing maneuvering under abnormal weather or atmospheric conditions. I however do not desire to be limited to the exact arrangement shown and described as changes and modifications may be made without departing from the scope of the invention.

I claim as follows:

1. A system for enabling incoming air pilots to determine just before reaching a landing field the exact location of the field when the runway, border and other lights on the field are invisible from above by being obscured by a comparatively low ceiling of smoke, fog, haze, or the like, comprising beam projectors installed at various sides of the field with means for operation thereof for synchronous oscillation of the beams at predetermined intervals toward and away from the field in vertical planes passing through the field center, said projectors being located a distance of say from one to three miles away from the field whereby a pilot may safely circle around the field under guidance of the projectors and the projected beams and determine therefrom the exact location of the field to enable him then to approach below the obscuring conditions for guidance thereafter to the runways by the runway and border lights.

2. A system for enabling incoming air pilots to determine just before reaching a landing field the exact location of the field when the runway, border and other lights on the field are invisible from above by being obscured by a comparatively low ceiling of smoke, fog, haze, or the like, comprising beam projectors installed at various sides of the field with means for operation thereof for synchronous oscillation of the beams in directions indicating the location of the field, said projectors being located a sufficient distance say from one to three miles away from the field so that the pilot may safely circle around the field above the obscuring conditions and under guidance of the projectors to determine the exact location of the field to enable him then to approach below the obscuring conditions for guidance thereafter to the runway by the runway and border lights.

THOMAS E. McDOWELL.